(12) United States Patent
K et al.

(10) Patent No.: US 10,060,067 B2
(45) Date of Patent: Aug. 28, 2018

(54) DETERMINING OUT OF BALANCE CONDITIONS OF A WASHING MACHINE

(71) Applicant: General Electric Company, Schenectady, NY (US)

(72) Inventors: Shahid Ali K, Bangalore (IN); Ashutosh Kulkarni, Bangalore (IN); Rahul Radhakrishna Pillai, Bangalore (IN)

(73) Assignee: HAIER US APPLIANCE SOLUTIONS, INC., Wilmington, DE (US)

( * ) Notice: Subject to any disclaimer, the term of this patent is extended or adjusted under 35 U.S.C. 154(b) by 119 days.

(21) Appl. No.: 15/150,684

(22) Filed: May 10, 2016

(65) Prior Publication Data

US 2017/0327988 A1    Nov. 16, 2017

(51) Int. Cl.
*D06F 37/20* (2006.01)
*D06F 37/30* (2006.01)
*G01M 1/16* (2006.01)

(52) U.S. Cl.
CPC ............ *D06F 37/203* (2013.01); *D06F 37/30* (2013.01); *D06F 37/304* (2013.01); *G01M 1/16* (2013.01)

(58) Field of Classification Search
CPC .................................................... D06F 37/203
See application file for complete search history.

(56) References Cited

U.S. PATENT DOCUMENTS

| | | |
|---|---|---|
| 5,259,218 A | 11/1993 | Broadbent |
| 5,345,792 A | 9/1994 | Farrington |
| 5,375,282 A | 12/1994 | Dausch et al. |
| 5,375,437 A | 12/1994 | Dausch et al. |
| 5,417,357 A | 5/1995 | Yquel |
| 5,462,388 A | 10/1995 | Polacek |
| 5,561,990 A | 10/1996 | Berkcan |
| 5,713,221 A | 2/1998 | Myers et al. |
| 5,893,279 A | 4/1999 | Schantz |
| 5,906,020 A | 5/1999 | Swint |
| 6,178,866 B1 | 1/2001 | Searle |
| 7,008,191 B2 | 3/2006 | Billington |
| 7,409,738 B2 | 8/2008 | Borras et al. |
| 7,765,837 B2 | 8/2010 | Hoppe et al. |

(Continued)

FOREIGN PATENT DOCUMENTS

| | | |
|---|---|---|
| CN | 1442551 A | 9/2003 |
| CN | 100359081 C | 1/2008 |

(Continued)

*Primary Examiner* — John Chapman, Jr.
(74) *Attorney, Agent, or Firm* — Dority & Manning, P.A.

(57) ABSTRACT

Systems and methods for determining an out of balance condition of a washing machine are provided. In particular, a plurality of angular positions of a motor associated with a washing machine can be determined. The washing machine can include a wash tub, and a wash basket rotatably mounted within the wash tub. The motor is configured to rotate the wash basket within said wash tub. Data indicative of at least a single phase of motor current being applied to the motor can be obtained while the wash basket rotates. The data can be spatially sampled over at least a subset of the plurality of angular positions of the motor. An out of balance condition associated with the washing machine can be determined based at least in part on the sampled data.

16 Claims, 5 Drawing Sheets

(56) References Cited

U.S. PATENT DOCUMENTS

| | | | |
|---|---|---|---|
| 8,499,392 B2 | 8/2013 | Suel, II et al. | |
| 2002/0035757 A1* | 3/2002 | Ciancimino | D06F 33/02 |
| | | | 8/159 |
| 2009/0035065 A1 | 2/2009 | Gavins | |
| 2009/0107185 A1 | 4/2009 | Filippa et al. | |
| 2010/0186458 A1 | 7/2010 | Kegler | |
| 2011/0197462 A1 | 8/2011 | Hasanreisoglu | |
| 2012/0003093 A1 | 1/2012 | Lischer | |
| 2012/0024018 A1 | 2/2012 | Huerth | |
| 2012/0065806 A1 | 3/2012 | Recio | |
| 2013/0186199 A1* | 7/2013 | Bhandwale | G01M 1/28 |
| | | | 73/462 |
| 2013/0243526 A1 | 9/2013 | Williamson | |
| 2015/0354124 A1* | 12/2015 | Halbleib | D06F 37/304 |
| | | | 68/12.16 |

FOREIGN PATENT DOCUMENTS

| | | |
|---|---|---|
| CN | 102959153 A | 3/2013 |
| DE | 69603475 T2 | 4/2000 |
| EP | 1523610 | 1/2009 |
| IN | 189287 B | 2/2003 |
| KR | 101158429 B1 | 6/2012 |
| WO | WO0127376 A1 | 4/2001 |

\* cited by examiner

DETERMINING OUT OF BALANCE CONDITIONS OF A WASHING MACHINE

FIELD OF THE INVENTION

The present subject matter relates generally to washing machines, and more particularly to determining an out of balance condition of a washing machine.

BACKGROUND OF THE INVENTION

Washing machines typically include a cabinet that receives a tub for containing wash and rinse water. A wash basket is rotatably mounted within the wash tub. A drive assembly and a brake assembly can be positioned with respect to the wash tub and configured to rotate and control the rotation of the wash basket within the wash tub to cleanse the wash load loaded into the wash basket. During a wash cycle, water is typically extracted from the wash load by revolving the wash basket containing the wash load at a high rotational velocity. Centrifugal forces pull the majority of the water out of the wash load and through perforations in the rotating basket. A pump assembly can be used to rinse and drain the extracted water to a draining system.

The rotating basket and wash tub are typically supported by a suspension system designed to dampen translational motion induced by any imbalance with in the rotating basket. High stresses are sometimes encountered within the basket, drive system, and suspension system during the high-speed spin action used for water extraction during normal wash cycles. An out of balance mass in the wash load during a high-speed spin cycle can generate significant forces, leading to damage to the washer. For instance, with an imbalance within the wash load, a force is generated which is proportional to the product of the mass, the distance between the imbalance and the center of rotation, and the square of the velocity. Continued spin operation with an out of balance load causes unnecessary wear and tear on mechanical and electrical components in the washer and reduces the reliability of the product over time.

Conventional imbalance detection techniques can require operating the washing machine at a predetermined rotational speed to determine an out of balance condition. For instance, such techniques can require ramping the washing machine down to the predetermined rotational speed, which can result in additional cycle time and power loss.

BRIEF DESCRIPTION OF THE INVENTION

Aspects and advantages of embodiments of the present disclosure will be set forth in part in the following description, or may be learned from the description, or may be learned through practice of the embodiments.

One example embodiment of the present disclosure is directed to a method of detecting an out of balance condition for a washing machine. The method includes determining a plurality of angular positions of a motor associated with a washing machine. The washing machine includes a wash tub, and a wash basket rotatably mounted within the wash tub. The motor is configured to rotate the wash basket within said wash tub. The method further includes receiving data indicative of at least a single phase of motor current being applied to the motor while the wash basket rotates. The method further includes spatially sampling the data indicative of the at least a single phase of motor current determined angular position of the motor. The method further includes determining an out of balance condition associated with the washing machine based at least in part on the sampled data.

Another example aspect of the present disclosure is directed to a system for detecting an out of balance condition for a washing machine. The washing machine includes a wash tub, a wash basket rotatably mounted within the wash tub, a motor configured to rotate the wash basket within the wash tub and an inverter coupled to the motor. The system includes a controller coupled to the inverter configured to control the inverter to operate the motor to rotate the wash basket at one or more rotational speeds during one or more sampling periods. The system further includes a sensor configured to monitor at least a single phase of motor current supplied to the motor from the inverter. The sensor provides a signal associated with the single phase of motor current to said controller. The controller is configured to determine a plurality of angular positions of the motor during at least one of the one or more sample periods, spatially sample the signal associated with the single phase of motor current at each angular position of the plurality of angular positions of the motor, and determine an out of balance condition associated with the washing machine based at least in part on the spatially sampled signal.

Yet another example aspect of the present disclosure is directed to a washing machine. The washing machine includes a wash tub, a wash basket rotatably mounted within the wash tub, a motor configured to rotate the wash basket within said wash tub, and an inverter coupled to the polyphase motor. The washing machine further includes a sensor configured to monitor at least a single phase of motor current supplied to the motor from the inverter. The washing machine further includes a controller configured to spatially sample a signal associated with the at least a single phase of motor current at a plurality of angular positions of the motor, and determine an out of balance condition associated with the washing machine based at least in part on a spectrum of the spatially sampled signal.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to determining out of balance conditions of a washing machine. For instance, a plurality of angular positions of a motor associated with a washing machine can be determined. At least a single phase of motor current being applied to the motor can be sampled over at least a subset of the determined angular positions. An out of balance condition associated with the washing machine can then be determined based at least in part on the sample motor current data.

More particularly, the washing machine can include a wash tub, a wash basket rotatably mounted within the wash tub, and a polyphase motor configured to rotate the wash basket within the wash tub. In various implementations, the washing machine can be a direct drive or a belt driven washing machine. An out of balance condition can correspond to an uneven distribution of mass in the wash load during operation of the washing machine. As indicated, such out of balance condition can cause damage to the washing machine.

The plurality of angular positions can correspond to a fixed angular frequency at which to sample the motor current. In various implementations, the angular positions can be determined using one or more sensors associated with the washing machine. For instance, the angular positions can be determined using one or more speed sensors, such as one or more tachometers, or one or more position sensors, such as one or more hall sensors, encoders, and/or other suitable position sensor. For instance, in implementations, wherein a tachometer or other speed sensor is used, the angular positions can be determined based at least in part on a rotational motor speed determined by the sensor. The rotational motor speed can be an instantaneous (e.g. real time) speed or an average speed. For instance, the motor speed and motor current can be sampled at a fixed time sampling rate and integrated to determine the angular positions at each time instant associated with the fixed time sampling rate. In implementations, wherein a position sensor is used, the angular positions can correspond to angular intervals. For instance, the angular intervals can correspond to each rising or falling edge associated with the position sensor.

The motor can be configured to receive one or more current signals, for instance, from an inverter associated with the washing machine. For instance, the inverter can be configured to provide one or more phases of current to the motor. Data indicative of at least a single phase of current can be received using one or more sensors, such as one or more current sensors, voltage sensors, etc. In some implementations, the received data from the sensor(s) can be spatially sampled at a fixed spatial sampling rate to determine one or more discrete signals indicative of the received current signal. In particular, the data can be sampled at each determined angular position of the motor. In this manner, the angular positions can be indicative of a sampling interval at which the data is sampled, such that a data sample is obtained at each sampling interval (e.g. angular position).

For instance, in implementations, wherein the angular positions are determined from a motor speed, the motor current can be sampled at a fixed sampling resolution corresponding to the determined angular positions. For instance, a time vector may be generated corresponding to a desired angular resolution using interpolation techniques, and the motor current can be spatially sampled at the fixed angular resolution. In such implementations, the angular positions may be predetermined (e.g. determined prior to the spatial sampling of the motor current). As indicated, in implementations, wherein the angular positions correspond to angular intervals determined from position sensors, the motor current can be spatially sampled at fixed angular intervals corresponding to each rising or falling edge of the signal associated with the sensor(s). In particular, each current sample can be triggered by a rising or falling edge of a sensor signal. In this manner, each current sample can be sampled at a fixed angular interval.

In some implementations, the data can be sampled during one or more sampling periods. The one or more sampling periods can correspond to one or more periods of time wherein the wash basket is accelerating or decelerating. In this manner, the out of balance condition can be determined during such acceleration or deceleration periods. For instance, in some implementations, a sampling period can correspond to a period of time within a wash cycle wherein the motor speed is accelerating or decelerating within a range of about 350 revolutions per minute (rpm) to about 600 rpm. As used herein, the term "about," when used in conjunction with a numerical value is intended to refer to within 40% of that value.

The sampled data (e.g. the discrete signal), can be used to determine an out of balance condition associated with the washing machine. A fundamental frequency associated with the motor current can be determined, for instance, based at least in part on one or more parameters of the specifications of the motor, such as a number of poles associated with the motor. One or more sideband frequencies (e.g. a left sideband frequency and/or a right sideband frequency) can then be determined based at least in part on the fundamental frequency of the motor. In particular, the fixed spatial sampling rate (e.g. fixed angular position) can provide a sideband frequency at a constant position relative to the fundamental frequency. An imbalance index can be determined based at least in part on the magnitude of the spectrum at one of the sideband frequencies (e.g. the left sideband frequency). In some implementations, the imbalance index can be determined based at least in part on a measurement of overall energy in a small frequency band proximate the sideband to reduce spectral leakage.

More particularly, at least a portion of the frequency spectrum of the motor current can be determined using one or more discrete Fourier transformations, discrete cosine transformations, wavelet transformations, or other suitable transformation. For instance, in some implementations, a plurality of frequency components can be determined by determining discrete Fourier transform coefficients corresponding to a frequency band associated with the fundamental frequency and sideband frequency. In some implementations, one or more digital filters may be used to filter the relevant portions of the determined spectrum. For instance, the one or more digital filters may include one or more Chebyshev filters, Butterworth filters, Elliptical filters, or other suitable digital filters.

The imbalance index can correspond to the magnitude of the spectrum at the sideband frequency. In some implementations, the imbalance index can be compared to an imbalance threshold to determine an out of balance condition. For instance, if the imbalance index is greater than the imbalance threshold, an out of balance condition can be determined. Conversely, if the imbalance index is less than the imbalance threshold, an out of balance condition will not be determined. In some implementations, the imbalance threshold can be determined based at least in part on the rotational speed of the motor and/or wash basket. For instance, a rotational speed may have a corresponding imbalance threshold that indicates an out of balance condition at the rotational speed. In some implementations, the imbalance threshold can be determined using a lookup table stored in a memory of the washing machine. The lookup table can include data correlating a plurality of rotational speeds with a plurality of imbalance thresholds.

In some implementations, an out of balance mass can further be determined based at least in part on the imbalance index. For instance, the magnitude of the spectrum of the motor current can correspond to the out of balance mass. In this manner, the out of balance mass can correspond to a measure of deviation of the imbalance index from the imbalance threshold.

In some implementations, a subsequent rotational speed of the motor and/or the wash basket can be determined based at least in part on the presence or absence of an out of balance condition. In particular, the rotational speed can be increased if the imbalance index is less than the imbalance threshold (e.g. if no out of balance condition is determined). If the imbalance index is greater than the imbalance threshold (e.g. if an out of balance condition is determined), the wash basket and/or motor can continued to be operated at the current rotational speed, or at a decreased operational speed. In some implementations, if the imbalance index is greater than the imbalance threshold, a rebalance process can be initiated.

Figure 1:
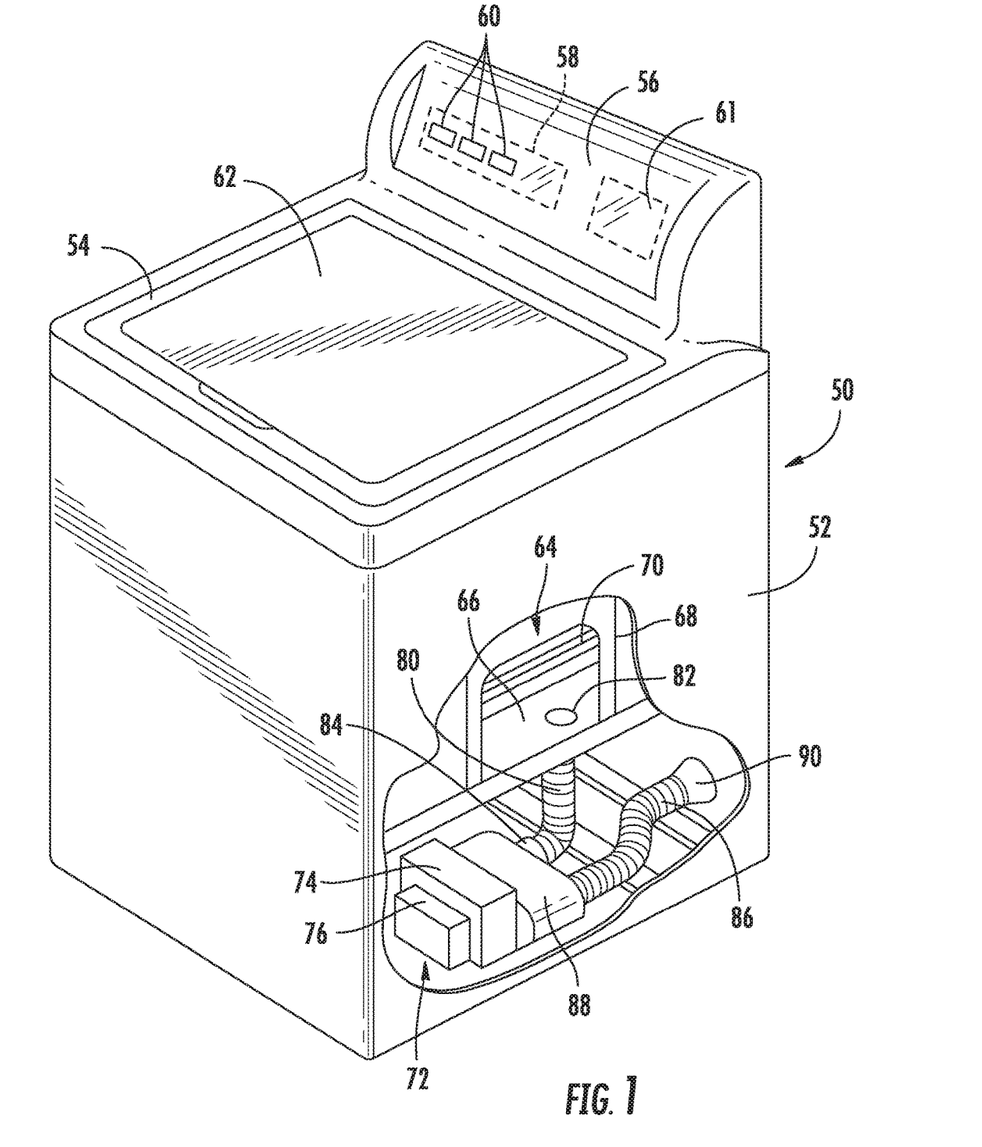
FIG. 1 depicts a perspective view of an example washing machine according to example embodiments of the present disclosure.

With reference now to the figures, example embodiments of the present disclosure will be discussed in greater detail. For instance, FIG. 1 depicts a perspective view partially broken away of an example washing machine 50 including a cabinet 52 and a cover 54. A backsplash 56 extends from cover 54, and a control panel 58 including a plurality of input selectors 60 is coupled to backsplash 56. Control panel 58 and input selectors 60 collectively form a user interface input for operator selection of machine cycles and features, and in one embodiment a display 61 indicates selected features, a countdown timer, and other items of interest to machine users. A lid 62 is mounted to cover 54 and is rotatable about a hinge (not shown) between an open position (not shown) facilitating access to a wash tub 64 located within cabinet 52, and a closed position (shown in FIG. 1) forming a sealed enclosure over wash tub 64.

As illustrated in FIG. 1, washing machine 50 is a vertical axis washing machine. While the present disclosure is discussed with reference to a vertical axis washing machine, those of ordinary skill in the art, using the disclosures provided herein, should understand that the subject matter of the present disclosure is equally applicable to other washing machines, such as horizontal axis washing machines.

Tub 64 includes a bottom wall 66 and a sidewall 68, and a basket 70 is rotatably mounted within wash tub 64. A pump assembly 72 is located beneath tub 64 and basket 70 for gravity assisted flow when draining tub 64. Pump assembly 72 includes a pump 74 and a motor 76. A pump inlet hose 80 extends from a wash tub outlet 82 in tub bottom wall 66 to a pump inlet 84, and a pump outlet hose 86 extends from a pump outlet 88 to an appliance washing machine water outlet 90 and ultimately to a building plumbing system discharge line (not shown) in flow communication with outlet 90.

Figure 2:
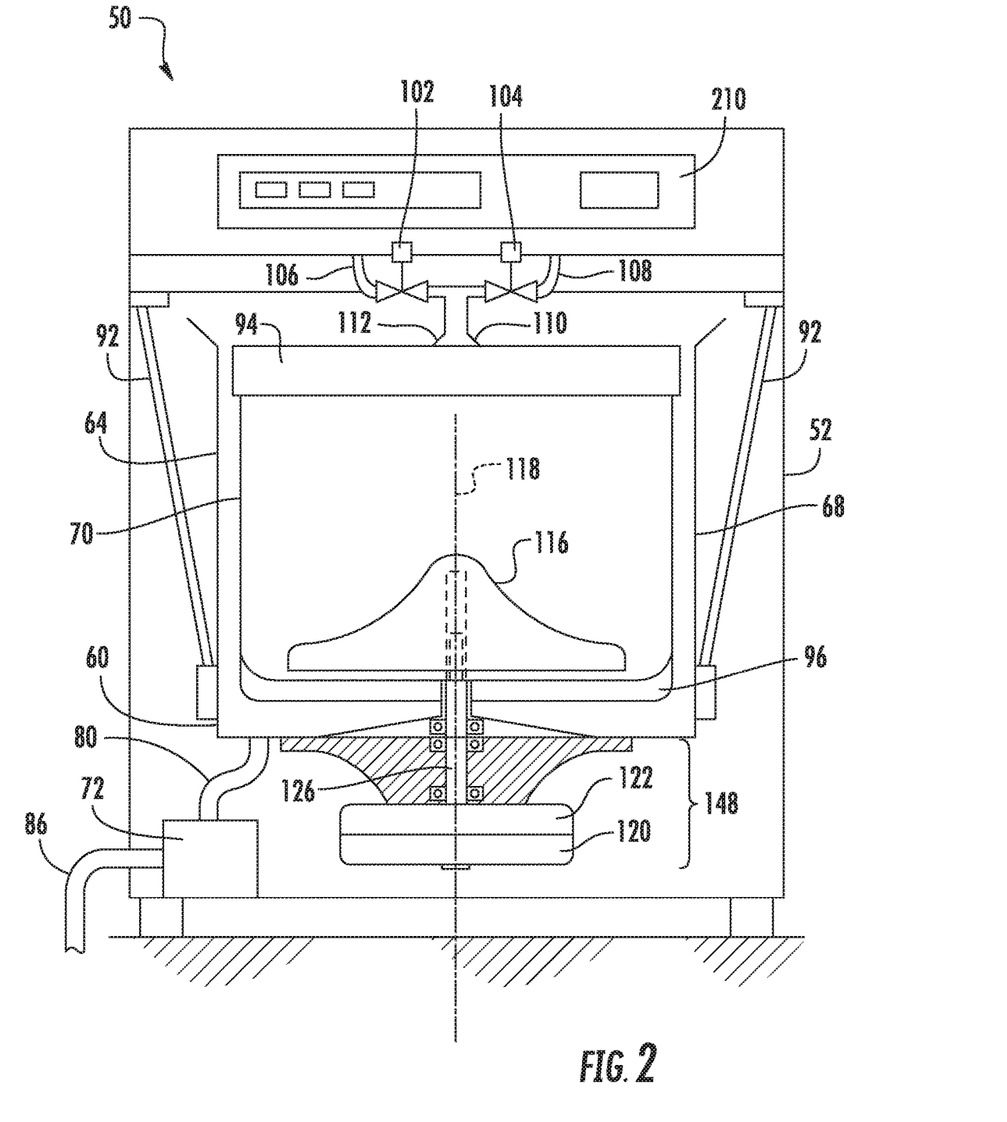
FIG. 2 depicts a side elevation schematic view of the washing machine of FIG. 1 according to example embodiments of the present disclosure.

FIG. 2 depicts a front elevational schematic view of washing machine 50 including wash basket 70 movably disposed and rotatably mounted in wash tub 64 in a spaced apart relationship from tub side wall 68 and tub bottom (not shown). Basket 70 includes a plurality of perforations therein to facilitate fluid communication between an interior of basket 70 and wash tub 64.

A hot liquid valve 102 and a cold liquid valve 104 deliver fluid, such as water, to basket 70 and wash tub 64 through a respective hot liquid hose 106 and a cold liquid hose 108. Liquid valves 102, 104 and liquid hoses 106, 108 together form a liquid supply connection for washing machine 50 and, when connected to a building plumbing system (not shown), provide a fresh water supply for use in washing machine 50. Liquid valves 102, 104 and liquid hoses 106, 108 are connected to a basket inlet tube 110, and fluid is dispersed from inlet tube 110 through a known nozzle assembly 112 having a number of openings therein to direct washing liquid into basket 70 at a given trajectory and velocity. A known dispenser (not shown in FIG. 2), may also be provided to produce a wash solution by mixing fresh water with a known detergent or other composition for cleansing of articles in basket 70.

A known agitation element 116, such as a vane agitator, impeller, auger, or oscillatory basket mechanism, or some combination thereof is disposed in basket 70 to impart an oscillatory motion to articles and liquid in basket 70. In different embodiments, agitation element 116 may be a single action element (i.e., oscillatory only), double action (oscillatory movement at one end, single direction rotation at the other end) or triple action (oscillatory movement plus single direction rotation at one end, singe direction rotation at the other end). As illustrated in FIG. 2, agitation element 116 is oriented to rotate about a vertical axis 118.

Basket 70 and agitator 116 are driven by a motor 120 through a transmission and clutch system 122. In an example embodiment, motor 120 is a polyphase variable speed motor. The motor 120 drives output shaft 126 to rotate basket 70 within wash tub 64. Clutch system 122 facilitates driving engagement of basket 70 and agitation element 116 for rotatable movement within wash tub 64, and clutch system 122 facilitates relative rotation of basket 70 and agitation element 116 for selected portions of wash cycles. Motor 120 and transmission and clutch system 122 collectively are referred herein as a machine drive system 148.

Basket 70, tub 64, and machine drive system 148 are supported by a vibration dampening suspension system 92. The damping system 92 can include a plurality of damping elements, such as piston-cylinder damping elements, coupled to the wash tub 64. The suspension system 92 can include other elements, such as a balance ring 94 disposed around the upper circumferential surface of the wash basket 70. The balance ring 94 can be used to counterbalance any out of balance condition for the wash machine as the basket 70 rotates within the wash tub 64. The wash basket 70 could also include a balance ring 96 located at a lower circumferential surface of the wash basket 70.

Suspension system 92 operates to dampen dynamic forces as the wash basket 70 rotates within the wash basket 64. The suspension system 92 has various natural operating frequencies of the dynamic system. These natural operating frequencies are referred to as the modes of suspension for the washing machine. For instance, the first mode of suspension for the washing machine occurs when the dynamic system including the wash basket 70, tub 64, and suspension system 92 are operating at the first resonant or natural frequency of the dynamic system. The second mode of suspension for the washing machine occurs when the dynamic system including the wash basket 70, tub, 74, and suspension system 92 are operating at the second resonant or natural frequency of the dynamic system.

Operation of machine 50 is controlled by a controller 210 which is operatively coupled to the user interface input located on washing machine backsplash 56 (shown in FIG. 1) for user manipulation to select washing machine cycles and features. In response to user manipulation of the user interface input, controller 210 operates the various components of machine 50 to execute selected machine cycles and features.

In an illustrative embodiment, laundry items are loaded into basket 70, and washing operation is initiated through operator manipulation of control input selectors 60 (shown in FIG. 1). Tub 64 is filled with water and mixed with detergent to form a wash fluid, and basket 70 is agitated with agitation element 116 for cleansing of laundry items in basket 70. That is, agitation element is moved back and forth in an oscillatory back and forth motion. In the illustrated embodiment, agitation element 116 is rotated clockwise a specified amount about the vertical axis of the machine, and then rotated counterclockwise by a specified amount. The clockwise/counterclockwise reciprocating motion is sometimes referred to as a stroke, and the agitation phase of the wash cycle constitutes a number of strokes in sequence. Acceleration and deceleration of agitation element 116 during the strokes imparts mechanical energy to articles in basket 70 for cleansing action. The strokes may be obtained in different embodiments with a reversing motor, a reversible clutch, or other known reciprocating mechanism.

After the agitation phase of the wash cycle is completed, tub 64 is drained with pump assembly 72. Laundry items are then rinsed and portions of the cycle repeated, including the agitation phase, depending on the particulars of the wash cycle selected by a user.

Figure 3:
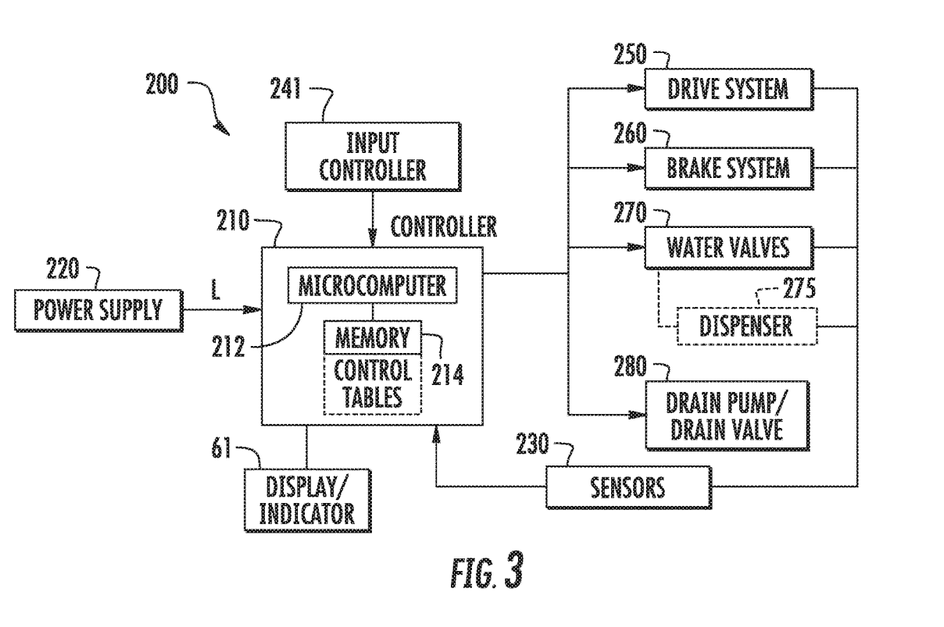
FIG. 3 depicts of block diagram of an example control system for a washing machine according to example embodiments of the present disclosure.

FIG. 3 is a schematic block diagram of an exemplary washing machine control system 200 for use with washing machine 50 (shown in FIGS. 1 and 2). Control system 200 includes controller 210 which may, for example, be a microcomputer 212 coupled to a user interface input 241. An operator may enter instructions or select desired washing machine cycles and features via user interface input 241, such as through input selectors 60 (shown in FIG. 1) and a display or indicator 61 coupled to microcomputer 212 displays appropriate messages and/or indicators, such as a timer, and other known items of interest to washing machine users. A memory 214 is also coupled to microcomputer 212 and stores instructions, calibration constants, and other information as required to satisfactorily complete a selected wash cycle. Memory 214 may, for example, be a random access memory (RAM). In alternative embodiments, other forms of memory could be used in conjunction with RAM memory, including but not limited to flash memory (FLASH), programmable read only memory (PROM), and electronically erasable programmable read only memory (EEPROM).

Power to control system 200 is supplied to controller 210 by a power supply 220 configured to be coupled to a power line L. Analog to digital and digital to analog converters (not shown) are coupled to controller 210 to implement controller inputs and executable instructions to generate controller output to washing machine components such as those described above in relation to FIGS. 1 and 2. More specifically, controller 210 is operatively coupled to machine drive system 250 (e.g., motor, inverter drive, mode shifter, etc.), a brake assembly 260 associated with basket 70, machine water valves 270 (e.g., valves 102, 104 shown in FIG. 2) and machine drain system 280 (e.g., drain pump assembly 72 and/or drain valve 130 shown in FIG. 2) according to known methods. In a further embodiment, water valves 270 are in flow communication with a dispenser 275 (shown in phantom in FIG. 3) so that water may be mixed with detergent or other composition of benefit to washing of garments in wash basket 70.

In response to manipulation of user interface input 241, controller 210 monitors various operational factors of washing machine 50 with one or more sensors or transducers 230, and controller 210 executes operator selected functions and features according to known methods. Of course, controller 210 may be used to control washing machine system elements and to execute functions beyond those specifically described herein. Controller 210 operates the various components of washing machine 50 in a designated wash cycle familiar to those in the art of washing machines.

Figure 4:
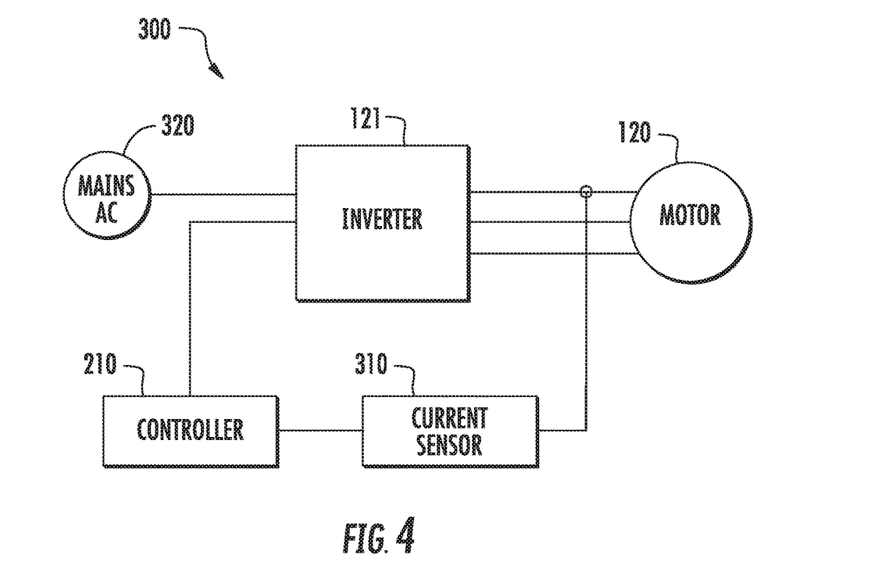
FIG. 4 depicts a schematic of an example inverter drive control system according to example embodiments of the present disclosure.

FIG. 4 depicts a schematic of an example inverter drive control system 300 that forms a part of control system 200 depicted in FIG. 3. Inverter drive control system 300 is used to control inverter 121. Inverter 121 delivers polyphase power to the motor 120 from a mains AC power source 320 and is used to control at least one operating parameter of polyphase motor 120. For instance, inverter 121 can be used to operate motor 120 at a particular rotational speed.

Inverter drive control system 300 includes a feedback system to control operation of motor 120. In the inverter drive control system 300 depicted in FIG. 4, feedback control system includes at least one current sensor 310 configured to monitor the single-phase current supplied to motor 120. According to an example aspect of the present disclosure, an out of balance condition can be detected for the washing machine using the existing inverter drive control system 300 for the washing machine.

In particular, the inverter 121 can be used to control motor 120 to rotate the wash basket 70 at a one or more rotational speeds. For instance, inverter 121 can control motor 120 to accelerate or decelerate the wash basket 70. Data indicative of at least a single phase of current can be obtained by current sensor 310 and provided to controller 210. Controller 210 can include one or more analog-to-digital converters (not shown) configured to spatially sample the obtained current data at a fixed spatial sampling rate. In particular, as indicated above, a plurality of samples can be obtained at a plurality of sample intervals that correspond to a plurality of angular positions of the motor 120. In some implementations, the data can be sampled during one or more sampling periods that correspond to the acceleration or deceleration of the wash basket 70. The sampled data can be used to determine a discrete current signal associated with the at least a single phase of current.

Controller 210 can be configured to determine an imbalance index based at least in part on the discrete current signal. In particular, controller 210 can be configured to determine a fundamental frequency associated with the motor current based at least in part on one or more parameters of motor 120 (e.g. the number of motor poles). Controller 210 can then determine one or more sideband frequencies based at least in part on the fundamental frequency of the motor 120. Controller 210 can be further configured to determine a relevant frequency band that includes the fundamental frequency and the one or more sideband frequencies.

A motor current spectrum can be determined by determining one or more discrete Fourier transform coefficients associated with the relevant frequency band. The magnitude of the spectrum at one of the sideband frequencies can be analyzed to determine an imbalance index. The imbalance index can be compared against an imbalance threshold to determine the presence or absence of an out of balance condition. As indicated above, one or more subsequent rotational speeds of motor 120 and/or wash basket 70 can be determined based at least in part on the comparison.

Figure 5:
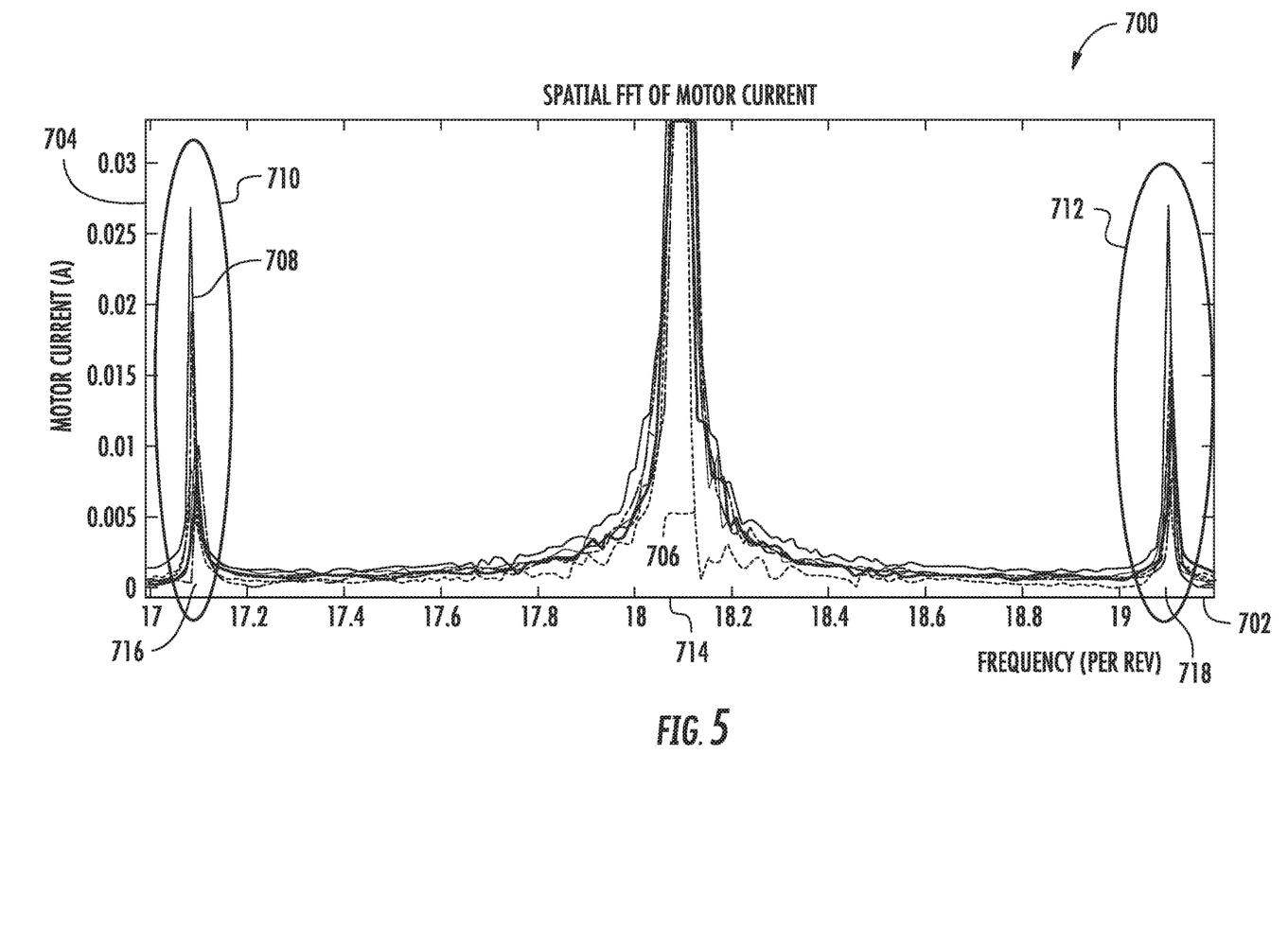
FIG. 5 depicts a plot of an example motor current spectrum according to example embodiments of the present disclosure.

FIG. 5 depicts a plot 700 illustrating a frequency spectrum of a motor current in accordance with example embodiments of the present disclosure. The plot 700 includes an x-axis 702 representative of frequency per revolution and a y-axis 704 representative of amplitude of the spectrum of the motor parameter. The plot 700 includes curves 706, 708 representative of the motor current corresponding to two load balance scenarios. The curve 706 corresponds to motor current spectrum when there is no imbalance in the washer basket. The curve 708 corresponds to motor current when the imbalance in the washer basket is caused due to 3 lb weight of clothes. A portion 710 of the curves 706, 708 is representative of left sideband of the spectrum of the motor current. A portion 712 of the curves 706, 708 is representative of right sideband of the spectrum of the motor current. The motor specifications and the operating parameters are used to determine a fundamental frequency 714 of the motor parameter. A torque oscillation frequency can determined based on the rotational speed of the motor. A left sideband frequency 716 corresponding to the portion 710 is determined by subtracting torque oscillation frequency from the fundamental frequency 714. A right sideband frequency 718 corresponding to the portion 712 is similarly determined by adding the torque oscillation frequency to the fundamental frequency 714. The curve 708 corresponding to the imbalance condition exhibits higher spectral magnitudes compared to the curve 706 corresponding to the absence of imbalance in the washer basket in the portion 710.

Figure 6:
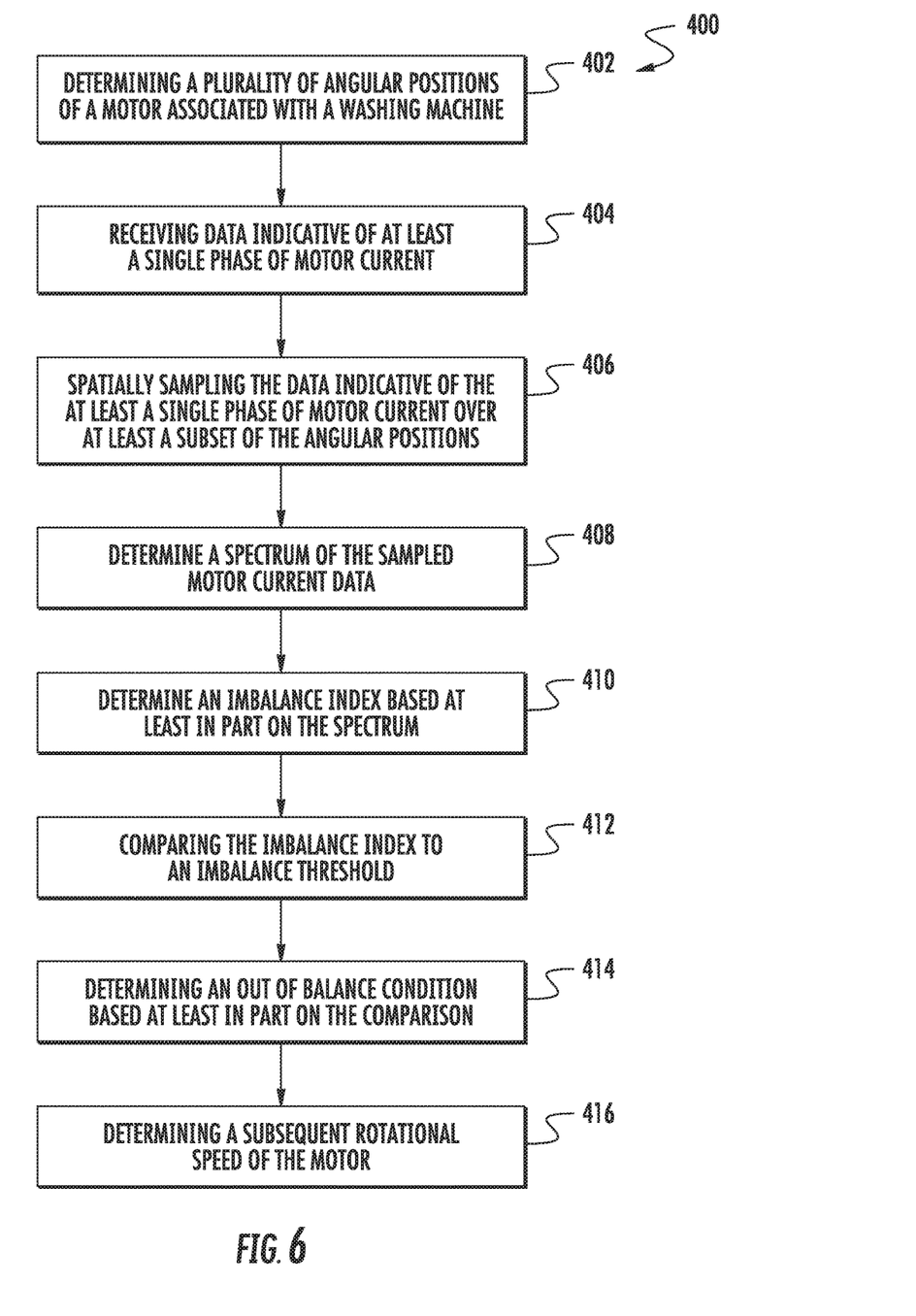
FIG. 6 depicts a flow diagram of an example method of determining an out of balance condition of a washing machine according to example embodiments of the present disclosure.

FIG. 6 depicts a flow diagram of an example method (400) of determining an out of balance condition of a washing machine according to example embodiments of the present disclosure. Method (400) can be implemented by one or more computing devices, such as one or more of the computing devices depicted in FIG. 3. In addition, FIG. 6 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (402), method (400) includes determining a plurality of angular positions of a motor associated with a washing machine. In some implementations, the angular positions can be determined using one or more sensors, such as one or more speed sensors or one or more position sensors. For instance, in implementations wherein one or more speed sensors are used, the angular positions can be predetermined based at least in part on a rotational speed of the motor associated with the washing machine. As indicated, in some implementations, the angular positions can correspond to a plurality of fixed angular intervals at which to digitally sample a motor current signal being supplied to the motor. For instance, the fixed angular intervals can correspond to the rising or falling edges of an output signal of one or more hall sensors and/or encoders associated with the washing machine. In this manner, the sample intervals can be determined to provide an adequately sampled signal.

At (404), method (400) can include receiving data indicative of at least a single phase of motor current. The data can be received from one or more current sensors configured to monitor the motor current.

At (406), method (400) can include spatially sampling the data indicative of the motor current at each of the sample intervals. The sample intervals can correspond to at least a subset of the plurality of determined angular positions (e.g. angular intervals) of the motor. In this manner, a digital sample of the motor current can be obtained at each sample interval to provide a spatially sampled discrete signal associated with the motor current. In some implementations, the motor current can be sampled to an angular resolution of about 0.1 degrees. In some implementations, the data can be sampled during one or more sampling periods corresponding to an acceleration state or a deceleration state of the wash basket. In some implementations the data can be sampled while the wash basket is rotating at a constant speed.

At (408), method (400) can include determining a spectrum associated with the discrete motor current signal. For instance, the spectrum can be determined by determining a fundamental frequency and one or more frequency sidebands of the motor current. In some implementations, a digital filter, such as a digital band pass filter can be used to select the relevant portion of the frequency spectrum. As indicated above, the spectrum can be determined using one or more discrete Fourier transformations, wavelet transformations, discrete cosine transformations, etc.

At (410), method (400) can include determining an imbalance index based at least in part on the spectrum. In particular, the imbalance index can correspond to a magnitude of the spectrum at one of the sideband frequencies.

At (412), method (400) can include comparing the imbalance index to an imbalance threshold. For instance, the imbalance threshold can correspond to the rotational motor and/or wash basket speed, and can be stored in a memory associated with the washing machine. The imbalance threshold can be indicative of an out of balance condition at the rotational speed.

At (414), method (400) can include determining an out of balance condition based at least in part on the comparison of the imbalance index to the imbalance threshold. In particular, an out of balance condition can be determined if the imbalance index is greater than the imbalance threshold. Conversely, an out of balance condition will not be determined if the imbalance index is less than the imbalance threshold. In some implementations, an out of balance mass can further be determined based at least in part on a measure of deviation from the imbalance index to the imbalance threshold.

At (416), method (400) can include determining a subsequent rotational speed of the motor and/or wash basket based at least in part on the presence or absence of an out of balance condition. For instance, if an out of balance condition is not determined, the subsequent rotational speed may be an increased motor speed. As another example, if an out of balance condition is determined, the subsequent rotational speed may be a decreased rotational speed, or the same as a current rotational speed.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of detecting an out of balance condition for a washing machine, the method comprising:
    determining a plurality of angular positions of a motor associated with a washing machine, the washing machine comprising a wash tub, and a wash basket rotatably mounted within the wash tub, wherein the motor is configured to rotate the wash basket within said wash tub;
    receiving data indicative of at least a single phase of motor current being applied to the motor while the wash basket rotates;
    spatially sampling the data indicative of the at least a single phase of motor current at each determined angular position of the motor;
    selecting a frequency band associated with the motor current, based at least in part on a rotational speed of the motor, by:
        determining a fundamental frequency associated with the motor current based at Least in part on one or more motor specifications: and
        determining a sideband frequency of the motor current with reference to the fundamental frequency based at least in part on the rotational speed; and
    determining an out of balance condition associated with the washing machine based at least in part on the sampled data and the selected frequency band.

2. The method of claim 1, wherein receiving data indicative of at least a single phase of motor current comprises receiving data indicative of the at least a single phase of motor current while the wash basket is accelerating or decelerating.

3. The method of claim 1, further comprising receiving data indicative of a rotational speed of the motor, and
    wherein determining a plurality of angular positions of a motor comprises determining a plurality of angular positions of the motor based at least in part on the data indicative of the rotational speed.

4. The method of claim 1, wherein determining a plurality of angular positions of a motor comprises determining a plurality of angular positions of the motor based at least in part on an output signal from one or more position sensors associated with the washing machine.

5. The method of claim 1, further comprising determining a subsequent rotational speed of the wash basket based at least in part on the out of balance condition.

6. The method of claim 5, wherein determining an out of balance condition associated with the washing machine comprises:
    determining an imbalance index of the washer basket based on a parameter of the motor within the frequency band; and
    comparing the imbalance index to an imbalance threshold.

7. The method of claim 6, further comprising estimating an out of balance mass of the washing machine based at least in part on the comparison of the imbalance index to the imbalance threshold.

8. The method of claim 5, wherein determining a subsequent rotational speed of the wash basket comprises increasing the rotational speed of the wash basket to a predetermined increased rotational speed based at least in part on the out of balance condition.

9. The method of claim 8, wherein the predetermined increased rotational speed is determined using a lookup table stored in a memory of the washing machine.

10. The method of claim 1, wherein the at least a single phase of motor current is monitored by a current sensor that is part of an inverter drive control system associated with the motor.

11. The method of claim 1, wherein the washing machine is a direct drive washing machine or a belt driven washing machine.

12. The method of claim 1, wherein the motor associated with the washing machine is a polyphase motor.

13. A system for detecting an out of balance condition for a washing machine, the washing machine comprising a wash tub, a wash basket rotatably mounted within the wash tub, a motor configured to rotate the wash basket within the wash tub and an inverter coupled to the motor, the system comprising:
    a controller coupled to the inverter, the controller configured to control the inverter to operate the motor to rotate the wash basket at one or more rotational speeds during one or more sampling periods;
    a sensor configured to monitor at least a single phase of motor current supplied to the motor from the inverter, the sensor providing a signal associated with the single phase of motor current to said controller;
    wherein the controller is configured to:
        determine a plurality of angular positions of the motor during at least one of the one or more sample periods;
        spatially sample the signal associated with the single phase of motor current at each angular position of the plurality of angular positions of the motor;
        select a frequency band associated with the motor current, based at least in part on a rotational speed of the motor, by:
            determining a fundamental frequency associated with the motor current based at least in part on one or more motor specifications; and
            determining a sideband frequency of the motor current with reference to the fundamental frequency based at least in part on the rotational speed; and
        determine an out of balance condition associated with the washing machine based at least in part on the spatially sampled signal and the selected frequency band.

14. The system of claim 13, wherein the one or more sampling periods correspond to one or more periods of time wherein the motor is accelerating or decelerating.

15. A washing machine, comprising:
a wash tub;
a wash basket rotatable mounted within the wash tub;
a motor configured to rotate the wash basket within said wash tub;
an inverter coupled to the polyphase motor;
a sensor configured to monitor at least a single phase of motor current supplied to the motor from the inverter;
a controller configured to:
   spatially sample a signal associated with the at least a single phase of motor current at a plurality of angular positions of the motor;
   select a frequency band associated with the motor current, based at least in part on a rotational speed of the motor, by:
      determining a fundamental frequency associated with the motor current based at least in part on one or more motor specifications; and
      determining a sideband frequency of the motor current with reference to the fundamental frequency based at least in part on the rotational speed; and
   determine an out of balance condition associated with the washing machine based at least in part on a spectrum of the spatially sampled signal and the selected frequency band.

16. The washing machine of claim 15, wherein the controller is configured to spatially sample the signal during one or more sampling periods wherein the motor is accelerating or decelerating.

\* \* \* \* \*

UNITED STATES PATENT AND TRADEMARK OFFICE
CERTIFICATE OF CORRECTION

| | | |
|---|---|---|
| PATENT NO. | : 10,060,067 B2 | Page 1 of 1 |
| APPLICATION NO. | : 15/150684 | |
| DATED | : August 28, 2018 | |
| INVENTOR(S) | : Shahid Ali K et al. | |

It is certified that error appears in the above-identified patent and that said Letters Patent is hereby corrected as shown below:

In the Claims

Claim 1: In Column 11, Line 41 - "Least" should read "least";

Claim 1: In Column 11, Line 42 - "specifications:" should read "specifications;";

Claim 15: In Column 13, Line 3 - "rotatable" should read "rotatably".

Signed and Sealed this
Eleventh Day of December, 2018

Andrei Iancu
*Director of the United States Patent and Trademark Office*